United States Patent Office 3,833,632
Patented Sept. 3, 1974

3,833,632
ALKYL FLUOROHEXAHALOGENOISOPROPOXY-CARBOXYLATE SILICON DERIVATIVES AND POLYMERS AND COPOLYMERS THEREOF
François Meiller, Palaiseau, France, assignor to Produits Chimiques Pechiney-Saint-Gobain, Neuilly-sur-Seine, France
No Drawing. Original application June 30, 1971, Ser. No. 158,614. Divided and this application Jan. 4, 1973, Ser. No. 320,906
Claims priority, application France, July 6, 1970, 7024957
Int. Cl. C07f 7/08
U.S. Cl. 260—448.2 B        6 Claims

ABSTRACT OF THE DISCLOSURE

This invention is addressed to derivatives of alkyl fluorohexahalogenoisopropoxycarboxylate silicon derivatives and polymers and copolymers formed thereof. The silicon derivatives of the present invention are useful as intermediates in the preparation of such polymers and copolymers which are useful as lubricants, as water repellent and oil repellent agents and as solvent resistant fluorinated elastomers.

---

This is a division of application Ser. No. 158,614, filed June 30, 1971.

This invention relates to alkyl fluorohexhalogenoisopropoxycarboxylate silicon derivatives as well as their polymers and copolymers, and to a process for the preparation of such silicon derivatives, polymers and copolymers.

It is known to prepare fluoroalkoxyalkyl silanes, products possessing an ether function, whose main use is the treatment of fibrous materials in order to impart to them water repellent and oil repellent properties.

It is an object of this invention to produce and provide a method for producing fluorinated silicon products possessing an ether function and which are useful in many fields.

According to this invention, the alkyl fluorohexahalogenoisopropoxycarboxylate silicon derivatives are compounds of the general formula:

$$\left[\begin{array}{c} X_3 \\ X_1-C-X_2 \\ F-C-O-(CH_2)_n-CO-(CH_2)_m- \\ X'_1-C-X'_3 \\ X'_2 \end{array}\right]-A$$

with A being selected from the

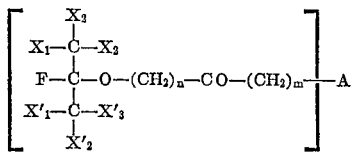

groups or a group of the formula:

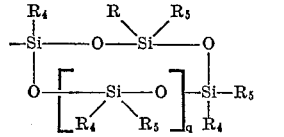

wherein $X_1$, $X_2$, $X_3$, $X'_1$, $X'_2$, and $X'_3$ represent a halogen atom, and preferably a chlorine or a fluorine atom, with the provision that the number of chlorine atoms of $X_1$, $X_2$, $X_3$, $X'_1$, $X'_2$ and $X'_3$ is 0, 1 or 2; $n$ is an integer having a value from 1 to 18; $m$ is an integer having a value from 2 to 7; $R_1$, $R_2$ and $R_3$ are identical or different among themselves and represent either non-reactive groups, such as alkyl groups comprising for instance from 1 to 3 carbon atoms (e.g., methyl, ethyl, isopropyl, etc.) or phenyl; or hydrolyzable groups, such as halogen atoms and preferably chlorine atoms, alkoxy groups comprising from 1 to 3 carbon atoms (e.g., methoxy, ethoxy, propoxy, etc.), phenoxy or acyloxy comprising from 2 to 4 carbon atoms (e.g., acetoxy, propionoxy, butyryloxy, isobutyryloxy, etc.); moreover, one of the $R_1$, $R_2$ and $R_3$ substituents can represent a hydrogen atom or a fluorohexahalogenoisopropoxycarboxyalkyl group in which the alkyl group contains 1 to 5 carbon atoms (e.g., isopropyl, butyl, methyl, ethyl, etc.); $R_4$ represents an alkyl group comprising from 1 to 3 carbon atoms (e.g., methyl, ethyl, propyl, etc.), a phenyl group or a hydrogen atom; $R_5$ represents an alkyl group comprising from 1 to 3 carbon atoms (e.g., methyl, ethyl, propyl), a phenyl group or a fluorohexahalogenoisopropoxycarboxyalkyl group; $q$ is an integer having a value equal or above 1 and preferably a value from 1 to 6.

As illustrative of silicon derivatives corresponding to the above-mentioned formula there can be cited for instance:

(heptafluoroisopropoxyacetoxypropyl)-
  dimethylchloro silane,
(heptafluoroisopropoxyacetoxypropyl)-
  methyldichloro silane,
(heptafluoroisopropoxyacetoxypropyl)-
  trichloro silane,
(hexafluorochloroisopropoxyacetoxypropyl)-
  methyldichloro silane,
(heptafluoroisopropoxyacetoxyethyl)-
  propyldichloro silane,
(pentafluorodichloroisopropoxyacetoxyethyl)-
  phenyldichloro silane,
(hexafluorochloroisopropoxybutyroxybutyl)-
  phenylmethylchloro silane,
bis(heptafluoroisopropoxyacetoxypropyl)-
  methylchloro silane,
(pentafluorodichloroisopropoxyacetoxyethyl)-
  methylchloro silane,
(hexafluorochloroisopropoxyacetoxypropyl)-
  phenylchloro silane,
(heptafluoroisopropoxyacetoxybutyl)-
  dimethylmethoxy silane,
(heptafluoroisopropoxyundecyloxyethyl)-
  methylphenylmethoxy silane,
(heptafluoroisopropoxyacetoxypropyl)-
  methyldiethoxy silane,
(heptafluoroisopropoxyacetoxypropyl)-
  phenyldiethoxy silane,
(hexafluorochloroisopropoxyacetoxyethyl)-
  phenylmethylethoxy silane,
pentafluorodichloroisopropoxyacetoxyethyl)-
  triethoxy silane,
(heptafluoroisopropoxyacetoxypropyl)-
  dimethylpropoxy silane,
(heptafluoroisopropoxyacetoxypropyl)-
  phenyldiacetoxy silane,
(heptafluoroisopropoxyacetoxypropyl)-
  heptamethylcyclotetrasiloxane,
(pentafluorodichloroisopropoxyacetoxypropyl)-
  heptamethylcyclotetrasiloxane,
heptafluoroisopropoxyacetoxypropyl)-
  nonamethylcyclopentasiloxane,
heptafluoroisopropoxyacetoxypropyl)-
  hexamethylcyclotetrasiloxane,
bis(hexafluorochloroisopropoxyacetoxyethyl)-
  hexamethylcyclotetrasiloxane,
tris(pentafluorodichloroisopropoxyacetoxypropyl)-
  pentamethylcyclotetrasiloxane,
tetrakis(heptafluoroisopropoxyacetoxypropyl)-
  tetramethylcyclotetrasiloxane, pentakis(heptafluoroisopropoxyacetoxyethyl)-
  pentamethylcyclopentasiloxane,
hexakis(heptafluoroisopropoxyacetoxypropyl)-
  hexaethylcyclohexasiloxane,
heptakis(heptafluoroisopropoxyacetoxypropyl)-
  heptamethylcycloheptasiloxane,
tetrakis(hexafluorochloroisopropoxyacetoxyethyl)-
  octamethylcyclohexasiloxane.

According to this invention, these silicon derivatives appear in the form of colorless liquids which are distillable when they are linear.

According to the process of preparation of alkyl fluorohexahalogenoisopropoxycarboxylate silicon derivatives of this invention, there are reacted (a) a silane of the formula:

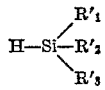

or a cyclic siloxane of the formula:

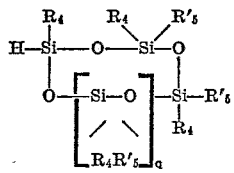

wherein $R'_1$, $R'_2$, $R'_3$ are identical or different among themselves and represent either nonreactive groups, such as alkyl groups comprising from 1 to 3 carbon atoms (e.g., methyl, ethyl, isopropyl, etc.), or phenyl; or hydrolyzable groups, such as halogen atoms and more particularly chlorine atoms, alkoxy groups comprising from 1 to 3 carbon atoms (e.g., methoxy, ethoxy, propoxy, etc.), phenoxy or acyloxy comprising from 2 to 4 carbon atoms (e.g., acetoxy, propionoxy, butyryloxy, etc.); moreover, one or two of the $R'_1$, $R'_2$ and $R'_3$ substituents can represent a hydrogen atom, $R_4$ and $q$ have the same meaning as set forth above and $R_5$, represents a hydrogen atom, an alkyl group comprising from 1 to 3 carbon atoms (e.g., methyl, ethyl, isopropyl, etc.), or a phenyl group with (b) an alkylene fluorohexahalogenoisopropoxycarboxylate of the formula:

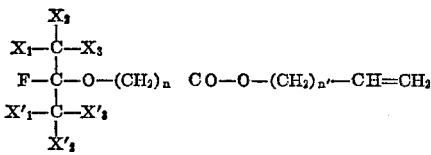

wherein $X_1$, $X_2$, $X_3$, $X'_1$, $X'_2$, $X'_3$ and $n$ have the same meaning as set forth above and $n'$ is an integer having a value from 0 to 5.

The reaction is carried out in the presence of a catalyst at a temperature comprised between 30 and 120° C. and preferably between 50 and 90° C.

Among the silanes and siloxanes which are reacted, the following compounds can be cited: methyldichloro silane, dimethylchloro silane, trichloro silane, propyldichloro silane, phenyldichloro silane, phenylmethylchloro silane, dimethylmethoxy silane, methylphenylmethoxy silane, phenylmethylethoxy silane, methyl diethoxy silane, phenyldiethoxy silane, triethoxy silane, phenyldiacetoxy silane, methylchloro silane, phenylchloro silane, methylethoxy silane, tetramethylcyclotetrasiloxane, pentamethylcyclopentasiloxane, hexamethylcyclohexasiloxane, heptamethylcycloheptasiloxane, pentamethylcyclotetrasiloxane, hexamethylcyclotetrasiloxane, heptamethylcyclotetrasiloxane, nonamethylcyclopentasiloxane, octamethylcyclohexasiloxane.

Alkylene fluorohexahalogenoisopropoxycarboxylates are prepared in a known manner by reacting an alkylene halogenocarboxylate with the reaction product of a hexahalogenoacetone and an alkali metal fluoride. Thus, there are brought into contact in stoichiometric proportion, a hexahalogenoacetone of the formula:

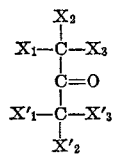

wherein $X_1$, $X_2$, $X_3$, $X'_1$, $X'_2$ and $X'_3$ have the same meaning as previously set forth and an alkali metal fluoride, and preferably a fluoride represented by the fluorides of potassium, sodium or cesium in a solvent, such as acetone, tetrahydrofuran, acetonitrile, dimethylformamide, diclyme, N-methylpyrrolidone, at room temperature, in an anhydrous medium and in the absence of all traces of oxygen. The reaction is carried on until disappearance of the insoluble alkali metal fluoride in the reaction medium. Then, to the solution thus obtained, there is added an alkylene halogenocarboxylate of formula:

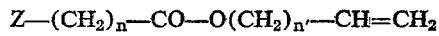

$$Z-(CH_2)_n-CO-O(CH_2)_{n'}-CH=CH_2$$

wherein $n$ and $n'$ have the same meaning as previously set forth and Z represents an atom of chlorine, iodine or preferably an atom of bromine. Alkylene halogenocarboxylates are represented by vinyl iodoacetate, allyl bromoacetate, butenyl bromoacetate, allyl ω-bromopropionate, butenyl bromobutyrate, vinyl ω-bromoundecanoate, allyl ω-bromoundecanoate.

The reaction is carried out at a temperature comprised between room temperature and 100° C., and preferably between 40 and 80° C. The reaction time varies from 3 to 150 hours according to the reactivity of the products used. The alkylene fluorohexahalogenoisopropoxycarboxylate formed is separated either by centrifuging or kneading the alkali metal halide formed and by evaporating the solvent or by treating the reaction medium with water followed by decantation and drying of the product. When at all possible, the product can be distilled under reduced pressure. The yield ranges from 80 to 90%.

Among the alkylene fluorohexahalogenoisopropoxycarboxylates, there can be cited allyl heptafluoroisopropoxyacetate,
allyl hexafluorochloroisopropoxyacetate,
vinyl heptafluoroisopropoxyacetate,
vinyl hexafluorochloroisopropoxyacetate,
vinyl pentafluorodichloroisopropoxyacetate, allyl pentafluorodichloroisopropoxyacetate, allyl heptafluoroisopropoxypropionate, butenyl heptafluoroisopropoxyacetate, butenyl hexafluorochloroisopropoxybutyrate, vinyl heptafluoroisopropoxyundecanoate, allyl hexafluorochloroisopropoxyundecanoate.

The catalyst used in the method of preparation of the silicon derivatives of this invention is composed of chloroplatinic acid or an alkali metal chloroplatinate and peroxides, such as diacetyl peroxide, benzoyl peroxide, tertiobutyl perbenzoate. The proportions of catalyst used range from 1 to 10 p.p.m. by weight of platinum based on the silane for chloroplatinic derivatives, and from 1–3% by weight based on the silane for peroxides.

Preferably the process is operated under atmospheric pressure, but according to the reactivity of the products, it may be operated under autogenous pressure. The reaction time ranges from 4–8 hours.

The silicon compound formed is then separated; the light products which may have been formed during the reaction are eliminated and the silicon compound, if it is distillable, is submitted to a distillation. The yield ranges from 60–80%.

According to an alternate method of the process of this invention, the alkyl fluorohexahalogenoisopropoxycarboxylate silicon derivatives are obtained by allowing to react the reaction product of an alkali metal fluoride and a hexahalogenoacetone, such as previously defined, with a halogenocarboxyalkyl silane or a cyclic halogenocarboxyalkylsiloxane having respectively the formula:

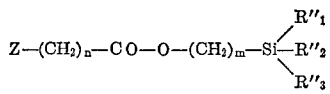

or

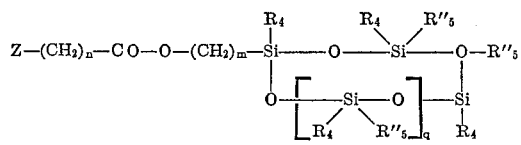

wherein Z, $R_4$, $n$, $m$ and $q$ have the same meaning as previously set forth, $R''_1$, $R''_2$ and $R''_3$ identical or different among themselves represent either non-reactive groups, such as alkyl groups comprising from 1 to 3 carbon atoms (e.g., methyl, ethyl, isopropyl), or phenyl group, either hydrolyzable groups, such as alkoxy groups comprising from 1 to 3 carbon atoms (e.g., methoxy, ethoxy, propoxy, etc.); moreover, one of the $R''_1$, $R''_2$ or $R''_3$ substituents can be a hydrogen atom or a halogenocarboxyalkyl group and $R''_5$ represents an alkyl group comprising from 1 to 3 carbon atoms (e.g., methyl, ethyl, isopropyl, etc.), a phenyl group or a halogenocarboxyalkyl group.

The reaction is carried out at a temperature comprised between room temperature and 40° C. for reaction durations varying from 10 to 150 hours, according to the reactivity of the products used.

Among the halogenocarboxyalkyl silanes and the cyclic halogenocarboxyalkyl siloxanes having the hereinabove mentioned formulae, the following compounds can be cited;

bromacetoxypropylmethyldiethoxy silane,
bromacetoxypropylphenyldiethoxy silane,
bromacetoxypropyldimethylethoxy silane,
bromacetoxypropylmethyldimethoxy silane,
bromacetoxypropyltriethoxy silane,
bromacetoxypropyldimethylpropoxysilane,
bromacetoxypropylphenylethoxysilane,
bromacetoxyethylphenyldimethoxysilane,
bromobutyroxybutylphenylmethylmethoxysilane,
bromacetoxypentyltriethoxysilane,
bromacetoxybutyldimethylmethoxysilane,
bromacetoxyethylpropylethoxysilane,
bromoacetoxyethylphenylmethylethoxysilane
bromopropionoxypropylmethylethoxysilane,
bromacetoxyethylmethylmethoxysilane,
tetrakis(bromacetoxypropyl)tetramethylcyclotetrasiloxane,
bromacetoxypropyltetramethylcyclotetrasiloxane,
bromacetoxypropylheptamethylcyclotetrasiloxane,
bis(bromoacetoxypropyl)hexamethylcyclotetrasiloxane,
bromacetoxypropylnonamethylcyclopentasiloxane,
bromacetoxyethylpentamethylcyclopentasiloxane,
bromacetoxyethylheptamethyldiphenylcyclopentasiloxane,
bis(bromacetoxyethyl)octamethylcyclohexasiloxane,
hexakis(bromacetoxypropyl)hexaethylcyclohexasiloxane,
heptakis(bromacetoxypropyl)heptaethylcycloheptasiloxane.

The alkyl fluorohexahalogenoisopropoxycarboxylate silicon derivatives according to this invention are useful as intermediate products, and particularly in the preparation of polymers and copolymers, by hydrolysis in the case of linear silanes, and by cycle rupture in the case of cyclic siloxanes.

In the first case, according to the number of hydrolyzable substituents attached to the silicon atom, polymers or copolymers having different structure and properties are obtained as follows: (1) If the silicon atom has a single hydrolyzable substituent, a dimer of the formula is obtained:

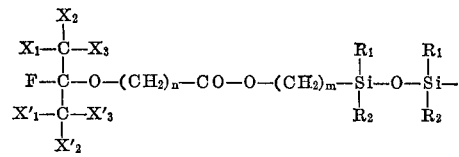

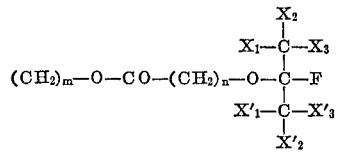

wherein each of $R_1$, $R_2$ and fluorohexahalogenoisopropoxycarboxy alkyl substituents may be similar or different from a silicon atom to the other depending on whether a single silicon derivative or a mixture of two silicon derivatives of this invention is hydrolyzed. They are liquid, colorless and distillable products.

The silicon derivative can be cohydrolyzed with a conventional silane possessing a hydrolyzable substituent and having the formula:

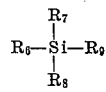

wherein $R_7$, $R_8$ and $R_9$ are identical or different among themselves represent a hydrogen atom, an alkyl group comprising from 1 to 3 carbon atom (e.g., methyl, ethyl, isopropyl, etc.), or a phenyl group and $R_6$ represents a halogen atom and more particularly a chlorine atom, an alkoxy group comprising for instance from 1 to 3 carbon atoms (e.g., methoxy, ethoxy, propoxy, etc.), a phenoxy group or an acyloxy group comprising from 2 to 4 carbon atoms (e.g., acetoxy, propionoxy, butyryloxy, etc.). These conventional silanes are, for instance: dimethylchloro silane, trimethylchloro silane, diphenylchloro silane, phenyldimethylchloro silane, triethylmethoxy silane and trimethylacetoxy silane.

A mixed dimer having the following formula is then obtained:

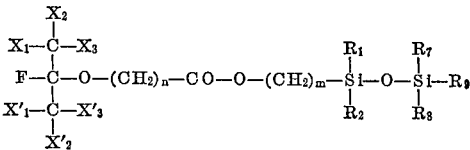

These dimers are liquid, colorless and distillable products.

One or several silicon derivatives may also be cohydrolyzed with at least a conventional silane possessing two hydrolyzable substituents and having the formula

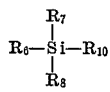

wherein $R_7$ and $R_8$ identical or different between themselves have the same meaning as above, and $R_6$ and $R_{10}$ are identical or different between themselves have the same meaning as that hereinabove mentioned for $R_6$. These conventional silanes are, for instance: methyldichloro silane, dimethyldichloro silane, phenyldichloro silane, phenylmethyldichloro silane, trifluoropropylmethyldichloro silane, phenyldiethoxy silane, diethyldimethoxysilane.

In this case, there is obtained a copolymer formed of a chain of monomeric units of the formula:

and of end group monomeric units of the formula:

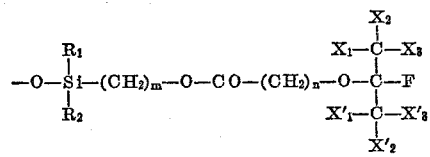

wherein each of the $R_7$, $R_8$, $R_1$ and $R_2$ and fluorohexahalogenoisopropoxycarboxyalkyl substituents may be similar or different from one unit to the other according to whether there are one or several silicon derivatives hydrolyzed with one or several conventional silanes.

These copolymers are liquid, colorless products whose first terms are distillable. (2) If the silicon atom possesses two hydrolyzable substituents, a linear polymer composed of a chain of monomeric units is obtained and having the formula:

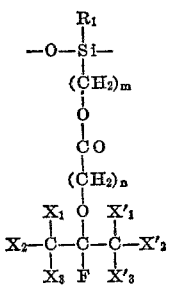

wherein each of the $R_1$ and fluorohexahalogenoisopropoxycarboxyalkyl substituents may be similar or different from one unit to the other according to whether a single silicon derivative or a mixture of two or several silicon derivatives of this invention are hydrolyzed.

These polymers or copolymers are more or less viscous, colorless, nondistillable liquids.

One or several silicon derivatives may be cohydrolyzed with at least a conventional silane possessing two hydrolyzable substituents and having the formula

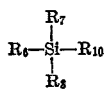

such as defined and cited hereinabove in (1).

The copolymer obtained is formed of a chain containing monomeric units of the formulae

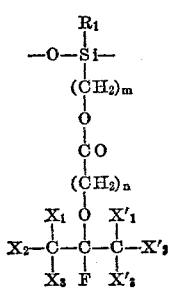

and

wherein each of the $R_1$, $R_7$ and $R_8$ and fluorohexahalogenoisopropoxyalkyl substituents may be similar or different from one unit to the other according to whether one or several silicon derivatives are hydrolyzed with one or several standard silanes.

The products obtained are more or less viscous, colorless, nondistillable liquids.

In order to obtain a more or less long chain of polymer or of copolymer of silanes having two hydrolyzable substituents of this invention, it is possible before hydrolysis, to add to them a predetermined amount of a chain limiting agent.

This chain limiting agent is represented either by a silane having a hydrolyzable substituent according to this invention, or by a conventional silane having a hydrolyzable substituent such as defined in (1); or still by a dimer or a mixed dimer according to this invention such as defined in (1); or finally by a conventional linear disiloxane of the formula:

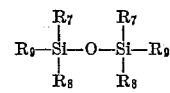

wherein $R_7$, $R_8$ and $R_9$ have the same meaning as previously, the disiloxane being represented, for instance, by hexamethylidisiloxane.

Chains of polymers or of copolymers having monomeric units such as represented hereinabove and end-grouped by monomeric units, of the formula:

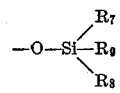

or

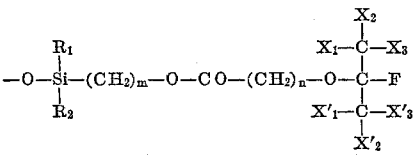

are thus obtained.

These polymers and copolymers containing chain limiting agents are more or less viscous liquids depending on the chain length, colorless, the first terms of which are distillable.

(3) If the silicon atom has thre hydrolyzable substituents, there is obtained a cross-linked polymer composed of monomeric units of formula:

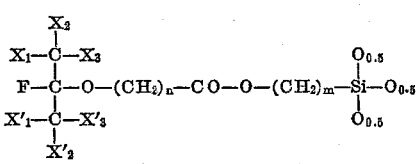

wherein each fluorohexahalogenoisopropoxycarboxyalkyl group attached to a silicon atom may be similar or different from one unit to the other according to whether a single silicon derivative or a mixture of several silicon derivatives of the invention are hydrolyzed.

One or several silicon derivatives having 3 hydrolyzable substituents may also be cohydrolyzed with at least one conventional silane having 3 hydrolyzable substituents and having the formula:

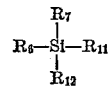

wherein $R_7$ represents a hydrogen atom, an alkyl group comprising from 1 to 3 carbon atoms (e.g., methyl, ethyl, isopropyl, etc.), a phenyl group, $R_6$, $R_{11}$ and $R_{12}$ similar or different represent a halogen atom, an alkoxy group comprising from 1 to 3 carbon atoms (e.g., methoxy, ethoxy, propoxy, etc.), a phenoxy group, an acyloxy group comprising from 2 to 4 carbon atoms (e.g., acetoxy, propionoxy, butyryloxy, etc.).

As conventional silane having three hydrolyzable substituents, there can be cited among other methyltrichloro silane, trichloro silane, phenyltrimethoxy silane, ethyltriethoxy silane, methyldichloromethoxy silane.

Cross-linked copolymers are hence obtained having monomeric units of the formula:

besides the hereinabove represented monomeric units.

The polymers and copolymers thus formed are very viscous, low molecular weight, colorless and nondistillable liquids.

The hydrolysis of the silanes of this invention involves allowing to react the silane or silanes with water at room temperature or with ice-water possible in the presence of a solvent, then in neutralizing the acid formed when the hydrolyzable substituent or substituents are halogen atoms, in decanting and in separating the desired product.

The amount of water used is generally in excess of the theoretical amount.

As possible solvents, products which dissolve the silane or silanes and the polymer or copolymer formed are used. They are, for instance, ether, hexane, toluene, benzene, xylene and dioxane.

When an acid is formed, this latter is neutralized by addition of diluted or undiluted caustic soda, potash, sodium carbonate, potassium carbonate, sodium bicarbonate, ammonia water solutions.

In the case of cyclic siloxanes, by opening of the cycle, linear polymers composed of monomeric unit chains are obtained of the formula:

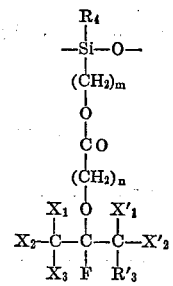

wherein each of the $R_4$ and fluorohexahalogenoisopropoxycarboxyalkyl substituent may be similar or different from one unit to the other according to whether a single cyclic siloxane or a mixture of several cyclic siloxanes is used as starting material.

One or several cyclic siloxanes can be copolymerized with at least one conventional cyclic siloxane having the formula:

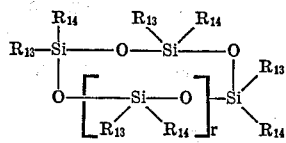

wherein $R_{13}$ and $R_{14}$ are identical or different between themselves represent an alkyl group comprising from 1 to 3 carbon atoms (e.g., methyl, ethyl, isopropyl, etc.), a phenyl group, or a hydrogen atom and $r$ is an integer having a value from 0 to 6. As conventional cyclic siloxane, the following may be cited:

hexamethylcyclotrisiloxane,
octamethylcyclotetrasiloxane,
decamethylcyclopentasiloxane,
tetramethylcyclotetrasiloxane,
heptamethylcyclotetrasiloxane.

Copolymers having monomeric units are hence obtained of the formula:

besides having also the hereinabove represented monomeric units.

These polymers and copolymers have very variable chain lengths according to the method of preparation employed.

Thus, when the cyclic siloxane or siloxanes are treated at room temperature with 10–15% of their weight of an acid catalyst, then neutralized, washed and dried, more or less viscous oils similar to those described in (2) are obtained.

As acid catalyst, there can be cited sulphuric acid, boron fluoride, tin tetrachloride, antimony pentachloride. Activated clays can also be cited, but in this case the reaction is achieved at 130–140° C.

In order to modify the chain length, a chain limiting agent as represented either by a dimer or a mixed dimer according to this invention, or by a conventional linear disiloxane such as described in (2) can be added to the cyclic siloxanes.

On the other hand, when the cyclic siloxane or siloxanes are treated at 130–170° C. for 2–8 hours, with 100 to 5000 p.p.m. by weight based on the silicon atoms of a basic catalyst, then neutralized with carbon dioxide snow, very high molecular translucent gums superior to 1,000,000 and with a Williams' plasticity of the order of 150 are obtained.

The basic catalysts are represented by potash, caustic soda, tetramethylammonium hydroxide.

The present invention is also directed to the applications of the obtained polymers and copolymers.

Thus, dimers and mixed dimers obtained from silanes having a hydrolyzable substituent are useful as chain limiting agents; polymers and copolymers having variable chain lengths, obtained from silanes having two hydrolyzable substituents or from siloxanes whose cycle is opened by means of an acid catalyst, are useful as lubricants having a variable viscosity; cross-linked polymers and copolymers obtained from silanes having three hydrolyzable substituents and more particularly those which have a Si—H bond are useful as water-repellent and oil-repellent agents in the textile, paper and leather industries; polymers and copolymers in the form of gum, obtained from siloxanes whose cycle is opened by means of a basic catalyst are useful as base material in the preparation of solvent-resistant fluorinated elastomers and having mechanical properties superior to those of conventional silicon elastomers.

Having described the basic concepts of the invention reference is now made to the following examples which are provided by way of illustration, and not by way of limitation, of the practice of the invention.

EXAMPLE 1

Preparation of (Heptafluoroisopropoxyacetoxypropyl)-Dimethylchloro Silane 8 g. of potassium fluoride and 200 g. of dry acetonitrile are introduced into a flask equipped with a stirrer and a gas introduction pipe. A suspension is obtained in which a dry nitrogen flow is passed, then a dry gaseous hexafluoroacetone flow is passed until disappearance of the potassium fluoride. 24 g. of hexafluoroacetone are then introduced. Then into the solution obtained, 26 g. of allyl bromoacetate are added and the solution is heated to 60° C., which is maintained for 10 hours. Afterwards, water is introduced, decanted and the product formed is dried and then distilled. It boils at 60–65° C./20 mm. of Hg.

The 28 g. of allyl heptafluoroisopropoxyacetate obtained in which 5 p.p.m. of chloroplatinic acid has been dissolved (in an isopropanol solution) are introduced into a flask fitted with a stirrer and a liquid introduction pipe. Air is drawn off by a nitrogen current and the flask is heated at 80° C. Then 10 g. of dry dimethylchlorosilane are introduced at a speed such that the temperature is maintained at 80° C. After introduction, this temperature is maintained for 1 hour.

By distillation at 90–108° C./18 mm. of Hg, 23 g. of a colorless liquid are collected, thus representing a yield of 60%.

The infrared analysis shows: two bands at 5.65$\mu$ and 5.75$\mu$ corresponding to —C=O, a band at 12.5$\mu$ corresponding to —Si(CH$_3$)$_2$ and a band at 21$\mu$ corresponding to —Si—Cl.

The elementary analysis gives the following results: Calculated (percent): C, 31.70; H, 3.70; F, 35.15; Cl, 9.39. Found (percent): C, 31.84; H, 3.62; F, 34.8; Cl, 9.25.

Thus confirming the formula:

$$\text{F}-\underset{\underset{\text{CF}_3}{|}}{\overset{\overset{\text{CF}_3}{|}}{\text{C}}}-\text{O}-\text{CH}_2-\text{CO}-\text{O}-(\text{CH}_2)_3-\underset{\underset{\text{CH}_3}{|}}{\overset{\overset{\text{CH}_3}{|}}{\text{Si}}}-\text{Cl}$$

The product contains about 1% by weight of an isomer.

EXAMPLE 2

Polymerization of Hydrolysis of the Product of Example 1

The product obtained in Example 1 is dissolved in 100 g. of ether, then hydrolyzed by addition of 100 ml. of water.

The hydrochloric acid formed is neutralized by addition of sodium bicarbonate, then the organic phase is decanted, dried, ether-evaporated and distilled. 17 g. are collected, representing a yield of 80% of a colorless, odorless liquid which distills over at 160° C./15 mm. of Hg.

The elementary analysis gives the following results: Calculated (percent): C, 34.28; H, 4; F, 38. Found (percent): C, 34.10; H, 3.75; F, 38.15.

$$\text{F}-\underset{\underset{\text{CF}_3}{|}}{\overset{\overset{\text{CF}_3}{|}}{\text{C}}}-\text{O}-\text{CH}_2-\text{CO}-\text{O}-(\text{CH}_2)_3-\underset{\underset{\text{CH}_3}{|}}{\overset{\overset{\text{CH}_3}{|}}{\text{Si}}}-\text{O}-\underset{\underset{\text{CH}_3}{|}}{\overset{\overset{\text{CH}_3}{|}}{\text{Si}}}-$$
$$(\text{CH}_2)_3-\text{O}-\text{OC}-\text{CH}_2-\text{O}-\underset{\underset{\text{CF}_3}{|}}{\overset{\overset{\text{CF}_3}{|}}{\text{C}}}-\text{F}$$

EXAMPLE 3

Preparation of (Heptafluoroisopropoxyacetoxypropyl)-Methyldichloro Silane

The same procedural steps as in Example 1 are employed but the 10 g. of dimethylchloro silane are replaced by 12 g. of methyldichloro silane.

After distillation at 123° C./18 mm. of Hg, 25 g. of a colorless liquid slightly fuming in damp air are obtained representing a yield of 64%.

The infrared analysis shows: two bands at 5.65$\mu$ and 5.75$\mu$ corresponding to —C=O, a band at 12.4$\mu$ corresponding to Si—CH$_3$, a band at 18.6$\mu$ corresponding to —Si—Cl$_2$ and a group of bands at 8–9$\mu$ corresponding to C—F.

The elementary analysis gives the following results: Calculated (percent): C, 27.07; H, 2.75; F, 33.33; Cl, 17.75. Found (percent): C, 27.2; H, 2.7; F, 33.45; Cl, 17.6.

Thus confirming the formula:

$$\text{F}-\underset{\underset{\text{CF}_3}{|}}{\overset{\overset{\text{CF}_3}{|}}{\text{C}}}-\text{O}-\text{CH}_2-\text{CO}-\text{O}-(\text{CH}_2)_3-\underset{\underset{\text{Cl}}{|}}{\overset{\overset{\text{Cl}}{|}}{\text{Si}}}-\text{CH}_3$$

EXAMPLE 4

Polymerization by Hydrolysis of the Product of Example 3

The product obtained in Example 3 is dissolved in 100 ml. of ether, then hydrolyzed with 150 ml. of water.

After neutralization, decantation, drying and evaporation of the ether, a colorless, odorless oil is obtained which has a viscosity of 160 centistokes at 20° C. (measured by its flow into a capillary tube, placed in a thermostatic bathe Baumé-Vigneron apparatus). The polymer is composed of a chain of monomeric units having a formula:

$$\begin{array}{c}\text{CH}_3\\|\\-\text{Si}-\text{O}-\\|\\(\text{CH}_2)_3\\|\\\text{O}\\|\\\text{CO}\\|\\\text{CH}_2\\|\\\text{O}\\|\\\text{F}_3\text{C}-\underset{\underset{\text{F}}{|}}{\overset{\overset{|}{\text{C}}}{|}}-\text{CF}_3\end{array}$$

EXAMPLE 5

Preparation of (Heptafluoroisopropoxyacetoxypropyl) Trichloro Silane

Example 1 is repeated, but with 14 g. of trichloro silane instead of the 10 g. of dimethylchloro silane.

After distillation at 132–136° C./22 mm. of Hg, 28 g. of a colorless liquid are obtained, fuming in damp air and representing a yield of 65%.

The infrared analysis shows: two bands of 5.65$\mu$ and 5.75$\mu$ corresponding to —C=O, a double bond at 1691$\mu$ and 17.7$\mu$ corresponding to —SiCl$_3$, a group of bands at 8–9$\mu$ corresponding to —C—F.

The elementary analysis gives the following results: Calculated (percent): C, 22.85; H, 1.92; F, 31.8; Cl, 25.40. Found (percent): C, 22.70; H, 2.05; F, 31.9; Cl, 25.30.

Thus corresponding to the formula:

$$\text{F}-\underset{\underset{\text{CF}_3}{|}}{\overset{\overset{\text{CF}_3}{|}}{\text{C}}}-\text{O}-\text{CH}_2-\text{CO}-\text{O}-(\text{CH}_2)_3\text{SiCl}_3$$

The product contains a very small quantity of an isomer.

EXAMPLE 6

Polymerization by Hydrolysis of the Product of Example 5

The product obtained in Example 5 is hydrolyzed in the same manner as in Example 4.

A cross-linked liquid polymer is obtained which has a viscosity of 5,000 centistokes at 20° C. and is composed of monomeric units having the formula $$\text{F}-\underset{\underset{\text{CF}_3}{|}}{\overset{\overset{\text{CF}_3}{|}}{\text{C}}}-\text{O}-\text{CH}_2-\text{CO}-\text{O}-(\text{CH}_2)_3-\underset{\underset{\text{O}_{0.5}}{|}}{\overset{\overset{\text{O}_{0.5}}{|}}{\text{Si}}}-\text{O}_{0.5}$$

EXAMPLE 7

Preparation of Hexafluorochloroisopropoxyacetoxypropyl) Methyldichloro Silane

Under the same conditions as in Example 1, 50 g. of allyl hexafluorochloroisopropoxyacetate are reacted with 19.5 g. of methyldichloro silane.

By distillation at 100–105° C./1.5 mm. of Hg, 43 g. of a colorless liquid are obtained representing a yield of 65%, the elementary analysis of which gives the following results:

Calculated (percent): C, 25.99; H, 2.65; Cl, 25.65; F, 27.44. Found (percent): C, 26.4; H, 2.95; Cl, 25.1; F, 26.6.

Thus corresponding to the formula:

$$\text{F}-\underset{\underset{\text{ClCF}_2}{|}}{\overset{\overset{\text{CF}_3}{|}}{\text{C}}}-\text{O}-\text{CH}_2-\text{CO}-\text{O}-(\text{CH}_2)_3-\underset{\underset{\text{Cl}}{|}}{\overset{\overset{\text{Cl}}{|}}{\text{Si}}}-\text{CH}_3$$

EXAMPLE 8

Ccopolymerization by Hydrolysis of the Product of Example 7

The following materials are mixed: 29.1 g. of the product obtained in Example 7, 24.2 g. of methydichloro silane, 2.28 g. of hexamethyldisiloxane and 100 ml. of hexane.

The mixture is then poured on ice under agitation, followed by its decantation, neutralization with sodium bicarbonate, washing with water, drying and evaporation of hexane.

40 g. of a colorless oil representing a yield of 85% are obtained.

The infrared analysis shows: a band at 4.6µ corresponding to —Si—H, two bands at 5.6µ and 5.72µ corresponding to —C=O, a group of bands between 8µ and 8.7µ corresponding to —C—F, and a group of bands between 9µ and 9.5µ corresponding to —Si—O—Si—.

The product is composed of a chain having monomeric units of formulae:

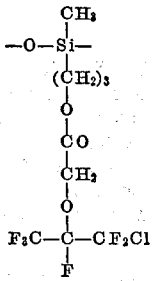

and

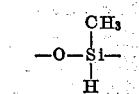

and end group monomeric units of formula

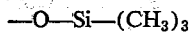

EXAMPLE 9

Preparation of (Heptafluoroisopropoxyacetoxypropyl) Methyldiethoxy Silane

As described in Example 1, 16.6 g. of potassium fluoride are reacted with 43 g. of hexafluoroacetone in 165 ml. of acetonitrile.

313 g. of bromoacetoxypropyl-methyl-diethoxy silane of formula:

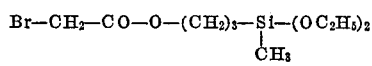

are then added.

The mixture is allowed to stand for a day at room temperature, then for 15 days at 40° C.

The potassium bromide formed is then filtered, the acetonitrile is distilled, then the product formed at 142° C./10 mm. of Hg which corresponds to the formula:

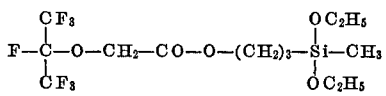

300 g. of product are obtained, that is to say, a yield of 72%.

The gas chromatography analysis shows that the product contains a little of the initial brominated product, about 2%.

EXAMPLE 10

Polymerization by Hydrolysis of the Product of Example 9

The 300 g. of the product obtained in Example 9 are dissolved in 600 ml. of ether, then hydrolyzed with 600 ml. of water. After neutralization by addition of sodium bicarbonate, decantation, drying and evaporation of the ether, 220 g. of a colorless and odorless oil are obtained and composed of a chain of monomeric units having the formula:

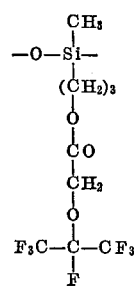

This oil has a viscosity of 170 centistokes at 20° C. and is practically identical to that of Example 4.

EXAMPLE 11

Preparation of Tetrakis (Heptafluoroisopropoxyacetoxypropyl)Tetramethylcyclotetrasiloxane The same procedural steps as in Example 1 are repeated by using: 420 g. of allyl heptafluoroisopropoxyacetate, 75 p.p.m. of chloroplatinic acid and 90 g. of tetramethylcyclotetrasiloxane.

360 g. of a quite viscous oil which does not distill are obtained representing a yield of 70%.

The infrared analysis shows: a large band at 12.4µ corresponding to —Si—CH$_3$, a group of bands at 8–9µ corresponding to —C—F and superposing a group of bands corresponding to —Si—O—Si.

Thus, confirming the formula:

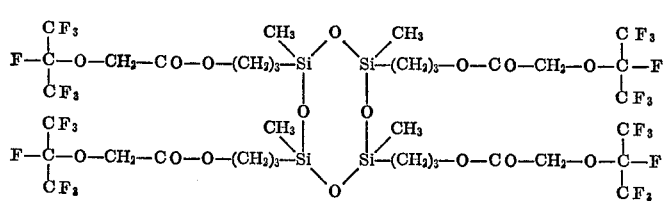

EXAMPLE 12

Polymerization of the Product of Example 7 by Rupture of the Ring 344 g. of the product of Example 11 are introduced into a vessel having a wide opening, fitted with a very efficient stirrer. The apparatus is flushed out by means of a current of nitrogen, then heated to 160° C. 0.05 g. of finely crushed potash is then added and maintained at 160° C. for 6 hours. The polymerization is then over. A gum is obtained which is neutralized with carbon dioxide snow as a sigma-type blade mixer.

The gum has a Williams' plasticity of 150. It is composed of a chain of monomeric units having the formula:

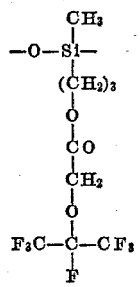

It will be understood that various changes and modifications may be made in the procedure, formulation and use without departing from the spirit of the invention, especially as defined in the following claims.

I claim:

1. Alkyl fluorohexahalogenoisopropoxycarboxylate silicon derivatives represented by the formula

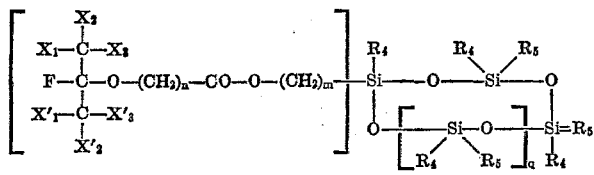

wherein $X_1$, $X_2$, $X_3$, $X'_1$, $X'_2$, $X'_3$ represent a halogen atom with the provision that the number of chlorine atoms of $X_1$, $X_2$, $X_3$, $X'_1$, $X'_2$ and $X'_3$ is 0, 1 or 2; $n$ is an integer having a value from 1 to 18; $m$ is an integer having a value from 2 to 7; $R_4$ represents an alkyl group containing 1 to 3 carbon atoms, a phenyl group or a hydrogen atom; $R_5$ represents an alkyl group containing 1 to 3 carbon atoms, a phenyl group or a fluorohexahalogenoisopropoxycarboxyalkyl group in which the alkyl contains 1 to 5 carbon atoms; and $q$ is an integer having a value equal to or superior to 1.

2. Silicon derivatives as defined in claim 1 wherein $X_1$, $X_2$, $X_3$, $X'_1$, $X'_2$ and $X'_3$ are each selected from the group consisting of fluorine and chlorine atoms.

3. Silicon derivatives as defined in claim 1 wherein $q$ is an integer from 1 to 6.

4. Process for the preparation of silicon derivatives according to claim 1 comprising reacting (a) a cyclic siloxane of the formula

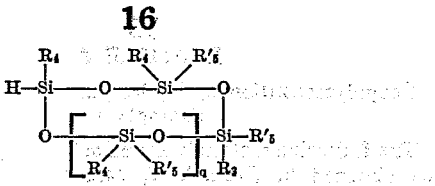

wherein $R_4$ and $q$ have the same meaning as in claim 1 and $R'_5$ represents a hydrogen atom, an alkyl group comprising from 1 to 3 carbon atoms or a phenyl group, with (b) an alkylene fluorohexahalogenoisopropoxycarboxylate of the formula

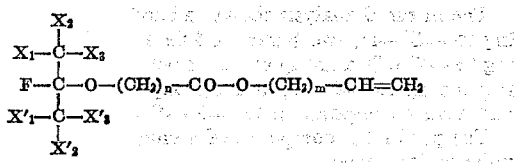

wherein $X_1$, $X_2$, $X_3$, $X'_1$, $X'_2$, $X'_3$ and $n$ have the same meaning as in claim 1 and $m$ is an integer having a value from 0 to 5, in the presence of a chloroplatinic or peroxide catalyst at a temperature between 30 and 120° C.

5. Process as defined in claim 4 wherein the reaction temperature is within the range of 50–70° C.

6. Process as defined in claim 4 wherein the reaction is carried out for 4 to 8 hours.

References Cited
UNITED STATES PATENTS

| | | | |
|---|---|---|---|
| 3,478,076 | 11/1969 | Kim et al. | 260—448.2 B |
| 3,458,554 | 7/1969 | Haluska | 260—448.2 B |
| 3,560,542 | 2/1971 | Kim et al. | 260—448.2 B |

DANIEL E. WYMAN, Primary Examiner

P. E. SHAVER, Assistant Examiner

U.S. Cl. X.R.

252—49.6; 260—448.2 E, 465 G

UNITED STATES PATENT OFFICE
CERTIFICATE OF CORRECTION

Patent No. 3,833,632  Dated September 3, 1974

Inventor(s) Francois MEILLER

It is certified that error appears in the above-identified patent and that said Letters Patent are hereby corrected as shown below:

IN THE SPECIFICATION

In column 1, line 58, in the formula, the middle "R" should be -- $R_4$ --.

In column 8, line 39, "thre" should read -- three --.

Signed and sealed this 3rd day of December 1974.

(SEAL)
Attest:

McCOY M. GIBSON JR.
Attesting Officer

C. MARSHALL DANN
Commissioner of Patents